Jan. 2, 1962  F. J. SUNTHEIMER  3,015,565
FERMENTATION PROCESSES FOR MAKING BREAD AND THE LIKE
Filed July 7, 1958
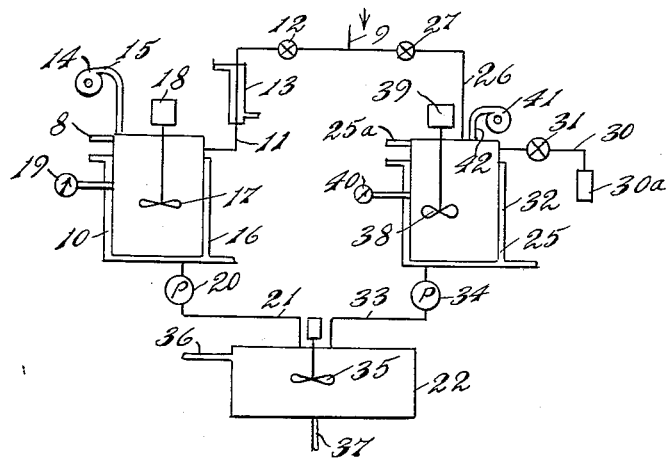
INVENTOR
Frank J. Suntheimer
BY
ATTORNEY

United States Patent Office 3,015,565
Patented Jan. 2, 1962

3,015,565
FERMENTATION PROCESSES FOR MAKING BREAD AND THE LIKE
Frank J. Suntheimer, York Road, Hatboro, Pa.
Filed July 7, 1958, Ser. No. 746,904
19 Claims. (Cl. 99—90)

This invention relates to fermentation processes for making bread and similar baked products.

Various processes have heretofore been proposed for mixing dough for bread and the like. One of the principal methods is known as the straight dough process in which all the necessary ingredients are mixed in one operation, the dough is then allowed to rise for about three to four hours, the dough is turned and folded, is then divided, rounded, proofed, moulded, panned, pan proofed for about one hour, baked and cooled. A total time in excess of six hours to the completion of baking is not unusual.

The other principal method is known as the sponge and dough process, in which part of the ingredients are first mixed to form a kind of dough called the sponge, which is permitted to rise for a period of about three and one-half to four and one-half hours and mature to the desired point, after which the sponge is then mixed with the doughing ingredients to provide the dough and after rising for about fifteen minutes the dough is then divided, rounded, proofed, moulded, panned and pan proofed for about one hour, baked and cooled. The dough, commencing with the dividing, is treated substantially the same in either process. A total time in excess of six to six and one-half hours to the completion of baking is not unusual.

The processes heretofore available have various disadvantageous characteristics. While baked products, and particularly bread, made by the straight dough process are popular in certain parts of the country, the advantages of the sponge and dough process in producing a large soft loaf with a very white crumb have resulted in the widespread use of the latter process.

In the practice of the processes heretofore available, a relatively large floor space was required for fermentation and a close range of temperature and humidity was required to be maintained in the fermentation rooms.

In the practice of processes for the production of dough heretofore available, it was not possible to vary the type of bread or other product to be obtained without encountering serious difficulty.

It has also heretofore been proposed under the designation of "no-dough-time process" to make bread dough omitting the step of fermentation in the dough trough with treatment under special temperature and humidity conditions. The product resulting was not satisfactory as to texture and flavor because of the rentention of excess yeast and failure to complete the oxidation of the yeast.

It is the principal object of the present invention to provide an improved process for the production of dough for yeast raised baked products which overcomes the objectionable characteristics of the processes heretofore available.

It is a further object of the present invention to provide a process for the production of yeast raised bread products which is relatively simple to carry out and with which uniformity of the finished product will be obtained.

It is a further object of the present invention to provide an improved process for the production of yeast raised baked products in which the waste will be minimized.

It is a further object of the present invention to provide improved processes for the production of yeast raised baked products in which the time required from the mixer to the oven will be greatly reduced so that the total time required is also substantially reduced.

It is a further object of the present invention to provide improved processes for the production of yeast raised baked products which do not require the allocation of any time for fermentation.

It is a further object of the present invention to provide improved processes for the production of yeast raised baked products in which the carbon dioxide and the hydrogen ion concentration in the dough can be readily controlled.

It is a further object of the present invention to provide improved processes for the production of yeast raised baked products in which the apparatus required for carrying out the process is simple in construction, is easy to install and maintain, and is free from complexity, and which has greatly reduced space requirements.

It is a further object of the present invention to provide improved processes for the production of yeast raised baked products in which carbon dioxide is introduced at a predetermined point in the process to increase the speed of operation.

It is a further object of the present invention to provide improved processes for the production of yeast raised baked products and both those employing the straight dough process and the sponge and dough process in which the mixing of part of the ingredients is carried out under pressure and with increased available oxygen and nitrogen.

It is a further object of the present invention to provide improved methods of dough treatment which are applicable both to the sponge and dough process and to the straight dough process.

It is a further object of the present invention to provide improved methods of dough treatment which are applicable to a wide variety of dough formulations.

Other objects and advantageous features of the invention will be apparent from the description and claims.

The nature and characteristic features of the invention will be more readily understood from the following description, taken in connection with the accompanying drawings forming part thereof, in which:

The figure is a diagrammatic view or flow chart illustrative of processes in accordance with the invention.

It should, of course, be understood that the description and drawings herein are illustrative merely, and that various modifications and changes can be made in the methods and ingredients disclosed, as well as the proportions thereof, without departing from the spirit of the invention.

In order to aid in the understanding of the invention a flow-chart is shown in the figure which has particular reference to the application of the present invention to processes of the sponge and dough type although, as hereinafter explained, straight dough processes can also be carried out therewith.

Referring to the figure, a tank 10 is provided having a sealable inlet 8 for the introduction of certain of the ingredients and having a water supply connection 11 connected thereto for the introduction of a regulated quantity of water from a water supply pipe 9, and controlled by a valve 12.

The water supply connection 11 can have a jacket or heat-exchanger 13 applied thereto with suitable provisions for supplying heating or cooling fluid thereto for raising or lowering the temperature of the water delivered through the supply connection 11, as required, to maintain the same at a proper temperature level, as hereinafter explained.

The tank 10 also has a motor driven air compressor or blower 14 connected thereto by a suitable pipe 15 for providing and maintaining in the interior of the tank 10 the desired pressure level.

The tank 10 may also be provided with a jacket 16 having suitable provisions for the supply of heating or cooling fluid thereto for maintaining the contents of the tank 10 at the desired temperature level, as hereinafter referred to.

The tank 10 is also provided with an agitator 17 for agitating and mixing the contents, the agitator 17 being driven by a suitable motor 18.

A suitable visual indicating acidity meter 19 is provided for visually observing the value of the pH of the contents of the tank 10.

The tank 10 has a pump 20 connected thereto by a conduit 21 for delivery of the contents thereof to a dough mixer 22 which may be of any preferred type for agitating the dough, and is preferably of a type known in the art as a high speed type. The speed will be dependent upon the number of agitating arms employed in the mixer 22 and for a single arm will be of the order of 225 r.p.m. and for a three arm mixer will be of the order of 75 r.p.m. The pump 20 is operated at predetermined timed intervals, as hereinafter pointed out.

A tank 25 having a sealable inlet 25a for the introduction of certain of the ingredients is also provided. The water supply pipe 9 is connected to the tank 25 by a pipe 26 with a valve 27 therein for controlling the quantity of water delivered to the tank 25. The tank 25 is also provided with a fluid connection 30 in communication therewith and having a control valve 31 therein, to which a supply 30a of carbon dioxide under pressure is connected. While commercially carbonated water can be employed, with suitable compensation in the dough formulations for the quantity of water thus introduced, the standard commercially available $CO_2$ cylinders can advantageously be used. The tank 25 preferably has an agitator 38 for agitating and mixing the contents, the agitator being driven by a motor 39. A suitable visual indicating acidity meter 40 for visually observing the condition of the contents of the tank 25 can also be provided. The tank 25 can advantageously be provided with a motor driven air compressor 41 connected thereto by a pipe 42 for maintaining the desired pressure level in the interior of the tank 25.

The carbon dioxide introduced in this manner has no effect on the yeast fermentation. It aids in reducing the strain on the yeast as a producer of carbon dioxide and does not act as a yeast retardant. The thus added carbon dioxide is an important factor compensating for the release of carbon dioxide from the dough upon working thereof in mixing and panning.

The tank 25 is preferably provided with a jacket 32, having suitable provisions for the supply of heating or cooling fluid thereto, so that the temperature in the interior of the tank 25 can be maintained at a desired level as hereinafter referred to.

The tank 25 has a fluid connection 33 in communication therewith with a pump 34 interposed therein for the delivery of the contents of the tank 25 to the dough mixer 22 at the appropriate time.

The dough mixer 22 has an agitator 35 for agitating and mixing the contents of the mixer 22 and an inlet connection 36 for the introduction of certain of the ingredients. The dough mixer 22 also has a discharge or outlet 37.

The entire preparation of the dough ready for dividing can be carried out with the apparatus referred to and without the necessity for fermentation as heretofore considered necessary.

The major ingredients, hereinafter referred to, are those commonly used in baking, and include flour, of suitable quality such as short patent or Kansas flour and preferably having a low diastatic characteristic; water adjusted in quantity to conform to the absorption characteristics of the flour and of suitable purity and free from undesired alkalinity; yeast of commercially available types; sugar, including mono saccharides and disaccharides; salt (sodium chloride); malt or malt syrup, preferably of regulated diastatic power in accordance with the flour employed; dough improver; shortening, vegetable shortening being preferred as it does not become rancid in storage; milk, in dry powdered form, although milk in liquid form can be used if suitable adjustments are made in terms of milk solids and of the water supplied through the tank 25; and vitamins, if desired.

Dough improvers are now available to supply minerals and nitrogen for the yeast, thereby stimulating yeast activity, mellowing the gluten, and aiding in attaining the desired acidity for dough fermentation and conditioning. One suitable dough improver, containing calcium sulphate, ammonium chloride, potassium bromate, salt and starch, available from the Fleischmann division of Standard Brands, Inc., under the trade name of "Arkady," has been found satisfactory, and with all the formulations given herein except where whole eggs are included, about three ounces can advantageously be used.

Another suitable dough improver, also available from the Fleischmann division of Standard Brands, Inc., under the trade name of "Fermaloid," and containing mono-calcium phosphate, ammonium sulphate, potassium iodate, potassium bromate, salt and starch, is also suitable and with the formulations given herein except where whole eggs are included, about five to six ounces can be used.

The quantity of dough improver will be varied in accordance with the characteristics of the water used and may vary from one to two ounces in either direction.

In addition, and as hereinafter more fully set forth, a suitable source of carbonic acid gas is employed which may consist of carbonated water but is preferably obtained from commercially available cylinders of $CO_2$, stored under pressure, and combined with water as hereinafter explained. The carbonic acid gas is employed to provide a favorable environment for the development of the gluten structure. Accordingly, when the dough containing the yeast is brought into contact with the dough which does not contain carbon dioxide, the action will be retarded and thus the gluten will be less elastic.

Alcohol, preferably ethyl alcohol, is also optionally employed, as hereinafter explained.

In order to aid in understanding the invention, reference will first be had to the preparation of a particular type of dough and the applicability to other types of dough formulation will then be pointed out. In each instance a rapid rate of production is available.

For purposes of illustration, reference will be had to formulations based on a standard or unit of 100 pounds of flour, the formulations for sponge and dough processes having a heading "Sponge" under which the amounts of the sponge forming components are listed and a heading "Dough" under which the amounts of the dough forming or doughing components are listed. Accordingly, the other and additional ingredients, whether expressed in units of pounds or percentages by weight based on this standard, will be full equivalents. Formulations for straight dough processes are identified as such.

Regular dough

A very useful and typical formulation is that for regular dough, and a suitable formulation by the sponge and dough process to which the present invention is applicable, is as follows:

|  | Sponge | Dough |
| --- | --- | --- |
| Flour | 50 to 70 pounds | 50 to 30 pounds. |
| Water | 32 pounds | 32 pounds. |
| Yeast | 5½ to 2½ pounds. |  |
| Salt | 3 ounces | 2 pounds. |
| Sugar |  | 5½ to 3 pounds. |
| Malt |  | ½ pound. |
| Milk, dry |  | 6 to 7 pounds. |
| Shortening |  | 4 to 6 pounds. |
| Dough improver |  | amount dependent on type used, as "Arkady," 4 ounces. |

As it is well known in the baking field, the quantities of certain ingredients can be varied and the ranges previously stated have been found to give good results.

A specific formulation for regular dough, and for the sponge and dough process, to which the present invention is applicable, is as follows:

|  | Sponge | Dough |
| --- | --- | --- |
| Flour | 60 pounds | 40 pounds. |
| Water | 32 pounds | 32 pounds. |
| Yeast | 4 pounds |  |
| Salt | 3 ounces | 2 pounds. |
| Sugar |  | 4 pounds. |
| Malt |  | ½ pound. |
| Milk, dry |  | 6½ pounds. |
| Shortening |  | 5 pounds. |
| Dough Improver |  | amount dependent on type used as "Arkady," 4 ounces. |

As the operation is the same for the typical formulation and for the specific formulation, the same will be described with particular reference to the typical formulation.

In the practice of the present invention, and for the purposes of employing the above typical formulation, there is introduced into the tank 10, as components for the formation first of a ferment, the following:

Water, about 32 pounds;
Yeast, about 5½ to 2½ pounds; and
Salt, about 3 ounces.

It will be noted that, as compared with ordinary sponge and dough formulations of this type, the quantity of salt is kept small so as not to interfere with the activity of the yeast and should not exceed about 0.1875% by weight.

The desired measured quantity of water is first introduced through the fluid connection 11 and the temperature of the water is preferably controlled, the maximum permissible temperature of the contents of the tank 10 being of the order of 72° F. although the temperature of the contents of the tank 10 can be permitted to fall to about 66° F. After the water has been supplied to the tank 10, the yeast is next introduced at the inlet 8, followed by the salt.

Air under pressure is supplied by the pump 14 and pipe 15 to the tank 10 to provide and maintain in the tank 10 a pressure of the order of 35 pounds per square inch, although pressures down to 20 pounds per square inch have produced satisfactory results. The use of the air under pressure thus supplied provides additional available oxygen and nitrogen to aid the action of the yeast. The salt can be supplied after the pressure has been applied.

The contents of the tank 10 are agitated and mixed by the agitator 17 for a period of from about five to ten minutes but the time period is determined by the acidity, as observed at the gage 19, and when the contents is in the range from $pH_{6.5}$ to $pH_6$, $pH_6$ being preferred, the agitation is discontinued and the contents of the tank 10 is transferred by the pump 20 to the dough mixer 22. The regulation of the pH is such that in the finished baked product the latter will be at $pH_{5.4}$.

At or about the same time as the water is introduced into the tank 10, a measured quantity of water, preferably about equal in amount to that introduced into the tank 10, and previously indicated as about 32 pounds, is introduced into the tank 25, for subsequent discharge, preferably in two stages. First, about 24 pounds of water at the desired temperature, and preferably at a temperature of the order of 66° F. to 72° F. is utilized and then the remaining, about 8 pounds, and at about the same temperature is carbonated. For this purpose, a measured quantity of carbon dioxide gas is delivered to the tank 25 through the supply connection 30. It has been found that from about 57 cc. to 115 cc. of the carbon dioxide gas at a pressure of about 30 p.s.i. provides satisfactory results, the quantity being dependent on the quantity of yeast and the time allowed for fermentation and being reduced proportionately to a reduction in the quantity of yeast. The lower part of the range has been found satisfactory. Variations in the quantity of carbon dioxide gas employed also varies the texture of the loaf as found in the finished baked product.

At or about the same time that the contents of the tank 10 are transferred to the dough mixer 22 the flour component of the sponge is added to the dough mixer 22 through the inlet 36, and consists, in the formulation above, of about 50 to 70 pounds of flour. The dough improver is now added. Part or all of the shortening can be added following the introduction of the flour. The contents of the dough mixer 22 are then agitated for about 3 minutes and while this agitation occurs the temperature in the mixer 22 is maintained at about 72° F.

The uncarbonated portion of the water at a temperature of the order of 66° F. to 72° F. from the tank 25 is then transferred to the dough mixer 22.

To the mixer 22 there is then added the doughing components, consisting essentially of the following:

Flour, about 30 to 50 pounds, or the balance of the 100 pound unit weight;
Salt, about 2 pounds;
Sugar, about 5 to 3 pounds;
Milk, about 6 to 7 pounds, with 6 pounds preferred;
Malt, about ½ pound;
Ethyl alcohol, if used, about 4 ounces.

The carbonated water at about the same temperature as previously mentioned is then transferred from the tank 25 to the mixer 22.

The use of the ethyl alcohol is optional, but it appears to aid in obtaining the desired environment in the mixer 22 and adds flavor.

After the components from the tanks 10 and 25 have been added to those placed in the dough mixer 22, as previously explained, the dough mixer 22 is operated at a high speed for about 10 minutes and when the temperature is at about 80° F. to 82° F. the dough thereby obtained is removed, is divided or cut, is rounded or shaped, and put into a molder in the usual manner in the making of bread or the like. The dough is then panned, and pan proofed by being placed in a warming room or proof box where the relative humidity is of the order of 85% and the temperature is of the order of about 94° F. The panned dough is retained in the warming room or proof box for a period of about one hour, and is then removed and baked in an oven, in the conventional manner, at a temperature of about 425° F. for a period of about 30 to 35 minutes. The total time, including scaling, up to the completion of the baking will run between one and three quarters and two hours.

If a less rapid operation with the sponge dough is desired or required, the quantity of yeast employed can be reduced, and if the quantity of yeast is reduced to one half of that stated above, i.e., to about 2½ pounds, a longer time will be required in the warming room or proof box, and the total time will be increased to about three and one-half hours.

For making rolls, by the sponge and dough process, and based on a standard or unit of 100 pounds of flour, the same procedure can be followed as in making bread insofar as the dough preparation is concerned, no fermentation being necessary, and the dough obtained is divided or cut, placed in a warming room or proof box, as previously pointed out, but for a shorter time interval, of the order of 20 to 25 minutes, the dough then removed and baked in an oven in the conventional manner at a temperature of about 425° F. for a period of about 25 to 30 minutes. The total time required to prepare the dough and complete the baking is about one and three quarter hours in place of about five and one-half or six hours previously required.

If desired, in place of the procedure stated above, the tank 10 can be utilized as previously pointed out. The tank 25 can be utilized, after the water has been introduced therein for the admixing with agitation of the milk powder, then the $CO_2$ is added to the tank 25 as before. The balance of the salt, the sugar, malt and ethyl alcohol, if used, are added to the tank 25 and agitated. The pressure of the order of 20 to 35 p.s.i. can be maintained in the tank 25. The contents of the tank 10 are first transferred to the mixer 22 and the first flour component with the dough improver are added to the mixer 22, the shortening is added to the mixer 22 and the whole agitated for the time previously stated and at the temperature indicated. The contents of the tank 25 are then transferred to the mixer 22 and mixed and then the balance of the flour is added with agitation. The remaining procedure is as before.

If it is desired to utilize a straight dough process, in place of the sponge and dough process, the operation is similar to that heretofore described. In place of an equal distribution of the water between the tanks 10 and 25, to the tank 10 the yeast, 4 pounds, and salt 3 ounces, is first introduced and then about 20 pounds of water is supplied at a temperature of the order of 66° F. to 72° F., after which the pressure is applied to the tank 10 as previously explained. The contents of the tank 10 is agitated and mixed until $pH_{6.5}$ to $pH_6$ is attained.

To the mixer 22, the salt, sugar, malt, and about 34 to 36 pounds of water at the temperature previously stated are supplied and agitated for about one minute to thoroughly mix. The flour, 100 pounds, with milk powder, 6 to 7 pounds, is then added and the contents of tank 10 introduced into the mixer 22. Carbonated water, 8 pounds, from the tank 25 is added at a temperature of the order of 66° F. to 72° F., the shortening is introduced and the mixer 22 operated for about 15 minutes until a temperature of about 80° F. to 82° F. is noted. The pressure can be maintained in the tank 25 as previously explained. The dough thus mixed is then divided, rounded, proofed, moulded and pan proofed for about 1 hour for bread, or about 25 to 30 minutes for rolls, and baked as before.

If a slower operating time is desired the quantity of yeast can be reduced in the manner previously pointed out with respect to the sponge dough.

It will be noted that the milk is not introduced into the tank 10. This has been found desirable because the development of the lactic acid has a tendency to slow down the action of the yeast, thereby increasing greatly the time required and reducing the effectiveness of the yeast.

An alternative character of operation can be employed. To the tank 25, about 34 to 36 pounds of water at the temperature previously stated are supplied, the milk powder, 6 to 7 pounds, is then added and mixed and the salt, dough improver, and malt are introduced into the tank 25. Carbonated water, 8 pounds, is added to the tank 25 and this and the other contents of the tank 25, at a temperature of the order of 66° F. to 72° F., are transferred to the mixer 22. The flour, 100 pounds, is added to the mixer 22 and agitated and the contents of the tank 10 are then transferred to the mixer 22. The shortening is introduced into the mixer 22 and the mixer 22 operated for about 15 minutes until a temperature of about 80° F. to 82° F. is noted. The pressure can be maintained in the tank 25 as previously explained. The dough thus mixed is then divided, rounded, proofed, moulded and pan proofed for about 1 hour for bread, or about 25 to 30 minutes for rolls, and baked as before.

A great variety of products can be made from a regular dough formulated as heretofore explained and includes various kinds of bread, including sandwich bread and white sliced bread, and also various kinds of rolls, including pocketbook, clover, homemade, frankfurter, snowflake, and soft rolls.

Various other types of doughs may also be utilized in connection with the invention as will now be explained, based as before on the standard or unit of 100 pounds of flour, and with the proportions variable.

Rye bread dough

A very useful and typical formulation for rye bread dough to which the present invention is applicable for a straight dough process, is as follows:

Flour, clear, 60 to 70 pounds;
Flour, rye, 40 to 30 pounds (to make up total flour 100 pounds);
Water, 62 pounds;
Yeast, 5 to 6 pounds;
Salt, 2 pounds 3 ounces;
Dough improver, dependent on type used, for example "Arkady," 4 ounces;
Malt (optional), 2 to 3 pounds; and
Shortening (optional), 2 pounds.

As illustrative of a more specific formulation, the following is suitable:

Flour, clear, 60 pounds;
Flour, rye, 40 pounds;
Water, 62 pounds;
Yeast, 5 to 6 pounds;
Salt, 2 pounds 3 ounces;
Dough improver, dependent upon type used, for example "Arkady," 4 ounces;
Malt, 2½ pounds; and
Shortening, 2 pounds.

About half the water and all the yeast are first agitated under pressure in the tank 10 as before, a portion of the water is carbonated as before in the tank 25, and the remainder of the ingredients are introduced into the mixer, in the manner previously explained for regular dough with a straight dough process, except that the mixing time in the mixer 22 will be much shorter and of the order of six to eight minutes, and the temperature of the finished dough will be of the order of 77° F. to 79° F.

If it is desired to utilize a sponge and dough process for making rye bread, the following is a typical formulation to which the invention is applicable:

|  | Sponge | Dough |
|---|---|---|
| Flour, clear | 30 to 35 pounds | 20 to 35 pounds. |
| Flour, rye | 15 to 20 pounds | 15 to 20 pounds. |
| Water | 31 pounds | 31 pounds. |
| Yeast | 5 to 6 pounds | |
| Salt | 3 ounces | 2 pounds. |
| Malt | | 2 to 3 pounds. |
| Shortening | | 2 pounds. |
| Dough improver | | dependent on type used, for example "Arkady," 4 ounces. |

The following specific formulation for making rye bread by the sponge and dough process has been found satisfactory:

|  | Sponge | Dough |
|---|---|---|
| Flour, clear | 30 pounds | 30 pounds. |
| Flour, rye | 20 pounds | 20 pounds. |
| Water | 31 pounds | 31 pounds. |
| Yeast | 5½ pounds | |
| Salt | 3 ounces | 2 pounds. |
| Malt | | 2½ pounds. |
| Shortening | | 2 pounds. |
| Dough improver | | dependent upon type used, for example "Arkady," 4 ounces. |

The ingredients are brought together first to provide the ferment, then the first part of the flour added, then the other ingredients are added, the temperature of the sponge being maintained of the order of 75° F. Then the balance of the flour is supplied and then the shortening added in the timed relations previously described and under like conditions, except for a shorter mixing time in the mixer 22 of the order of six to eight minutes, and the finished dough temperature being of the order of 77° F. to 79° F. The pan proofing is preferably effected at a lower humidity of the order of 60% to 70% with a temperature of about 94° F. The baking follows normal baking procedures as to time and oven temperature and can include the use of steam discharged into the oven at a pressure of 8 to 10 p.s.i.

Dough made in this manner is suitable for producing rye bread, including hearth rye bread, and rye rolls.

Sweet dough

A typical formulation of sweet dough, to which the invention is applicable and for a straight dough process, is as follows:

Flour, spring, 80 to 100 pounds
Flour, cake, 20 pounds, if substituted for the spring flour to make up flour total, 100 pounds
Eggs, whole, 15 pounds
Water, 50 to 42 pounds
Yeast, 10 to 11 pounds
Salt, 20 to 24 ounces
Malt, 2 to 3 pounds
Sugar, 17 pounds
Milk, powdered, 5 pounds
Shortening, 20 pounds
Flavoring, optional and in accordance with accepted baking practice A specific sweet dough formulation can be as follows:

Flour, spring, 80 pounds;
Flour, cake, 20 pounds;
Eggs, whole, 15 pounds;
Water, 42 pounds;
Yeast, 10½ pounds;
Salt, 20 ounces;
Malt, 2½ pounds;
Sugar, 17 pounds;
Milk, powdered, 5 pounds; and
Shortening, 20 pounds;
Flavoring, optional, and in accordance with accepted baking practice;

The procedure to be followed is the same as that previously pointed out for straight dough processing for regular dough except that the finished temperature of the dough is maintained at about 80° F. to 84° F. and the time required is about 10 minutes.

A typical formulation for the sponge and dough process to which the invention is applicable, is as follows:

|  | Sponge | Dough |
|---|---|---|
| Flour, spring | 60 to 40 pounds | 40 to 60 pounds. |
| Flour, cake | 10 pounds, maximum can be substituted for the spring flour. | 10 pounds, maximum can be substituted for the spring flour. |
| Water | 21 to 25 pounds | 21 to 25 pounds. |
| Yeast | 10 to 11 pounds | |
| Salt | 3 ounces | 17 to 21 ounces. |
| Shortening | | 20 pounds. |
| Malt | 12 ounces | 2 pounds. |
| Sugar | | 17 pounds. |
| Milk, powdered | | 5 pounds. |
| Eggs, whole | | 15 pounds. |

A specific formulation for sweet dough by the sponge and dough process is as follows:

|  | Sponge | Dough |
|---|---|---|
| Flour, spring | 60 pounds | 20 pounds. |
| Flour, cake | 10 pounds | 10 pounds. |
| Water | 21 pounds | 21 pounds. |
| Yeast | 10½ pounds | |
| Salt | 3 ounces | 17 ounces. |
| Shortening | | 20 pounds. |
| Malt | 12 ounces | 2 pounds. |
| Sugar | | 17 pounds. |
| Milk, powdered | | 5 pounds. |
| Eggs, whole | | 15 pounds. |

The ingredients are processed in the manner previously indicated for regular dough, with approximately one-half the water and the salt and yeast being mixed first in the mixer 10, at the pressure previously indicated. The sponge is maintained in the mixer 22 with a temperature of the order of 78° F. maintained in the sponge. The other ingredients are added in the manner also previously indicated for regular dough but the finished dough temperature is maintained of the order of 84° F. The mixing time for the sponge will be about 4 minutes and for the dough about 6 minutes, or a total of about 10 minutes.

The products made from sweet dough can be those commonly made, including cakes, coffee cakes, rings, and the like.

If it is desired to use the sweet dough for making doughnuts, upon the completion of the mixing in the mixer 22, the dough is left in the mixer and for every 10 pounds of dough there is added:

|  | Pounds |
|---|---|
| Water | 2 |
| Bread flour | 2 |
| Milk powder | ½ |

The materials in the mixer 22 are then remixed thoroughly for a few minutes. The dough can then be removed, formed or shaped and fried in the conventional manner for making doughnuts.

Hearth bread dough

A typical formulation for the preparation of hearth bread dough by the sponge and dough process, and to which the invention is applicable, is as follows:

|  | Sponge | Dough |
|---|---|---|
| Flour, high gluten | 65 pounds | 35 pounds. |
| Water | 37 pounds | 23 to 20 pounds. |
| Yeast | 3½ to 4½ pounds | |
| Yeast Improver | 3 to 4 ounces | |
| Salt | 3 ounces | 1 pound 14 ounces. |
| Shortening | | 4 pounds. |
| Malt | 1½ pounds | 1½ pounds. |
| Sugar | | 3 pounds. |
| Egg Whites | | 2½ to 3 pounds. |
| Milk powder | | 3 pounds. |

A specific formulation for the preparation of hearth bread dough by the sponge and dough process, is as follows:

|  | Sponge | Dough |
|---|---|---|
| Flour, high gluten | 65 pounds | 35 pounds. |
| Water | 37 pounds | 23 pounds. |
| Yeast | 4 pounds | |
| Salt | 3 ounces | 1 pound 14 ounces. |
| Shortening | | 4 pounds. |
| Malt | 1½ pounds | 1½ pounds. |
| Egg Whites | | 2½ pounds. |
| Milk, powdered | | 3 pounds. |

The regulated quantity of water and the yeast are processed as previously explained, and thereafter the procedure followed is that previously pointed out for the regular dough prepared by the sponge and dough process except that the mixing time in the mixer 22 will only be about 6 minutes, the sponge will be maintained at a temperature of the order of 70° F. and the finished dough temperature will be maintained of the order of 75° F. to 76° F. The pan proofing is effected at 94° F. and at a relative humidity of about 60% to 70%. For a crisp crust, steam can be introduced into the oven as with the rye bread.

Typical and specific formulations for production of hearth bread dough by the straight dough process will employ the ingredients in the quantities indicated above for making hearth bread dough by the sponge and dough process, but combined in a straight dough process of the character indicated with other straight dough formulations.

With a dough of this character a variety of products can be prepared, including that commonly referred to as hearth bread, as well as Italian bread, Vienna bread, kaiser rolls, gimbel rolls, salt sticks, poppy seed sticks, and the like.

60% whole wheat dough

A typical formulation for the preparation of whole wheat dough, to which the invention is applicable is as follows:

|  | Sponge | Dough |
|---|---|---|
| Flour, whole wheat | 60 pounds | |
| Flour, white clear | 10 pounds | 30 pounds. |
| Yeast | 5 to 6 pounds | |
| Water | 48 pounds | 21 pounds. |
| Salt | 3 ounces | 2 pounds 1 ounce. |
| Sugar | | 6 pounds. |
| Milk powder | | 2½ to 3 pounds, if desired. |
| Malt | 6 ounces | |
| Dough improver | 3 ounces | |
| Shortening | | 4 pounds. |

The yeast and water in regulated quantity are treated as before, after which the ingredients are added in the manner previously indicated to make the regular dough. The sponge temperature is maintained at about 69° F. to 70° F. and the finished dough temperature maintained at about 79° F. The pan proofing is effected at 94° F. and at a relative humidity of about 80% to 85%.

From this whole wheat dough, as described, a variety of products can be made, including whole wheat bread, whole wheat rolls, clover rolls, pocketbook rolls, homemade rolls, and the like.

Typical and specific formulations for production of whole wheat dough by the straight dough process will employ the ingredients in the quantities indicated above for making whole wheat dough by the sponge and dough process but combined in a straight dough process of the character indicated with other straight dough formulations.

This application is a continuation in part of my prior application filed August 23, 1957, Serial No. 679,841.

I claim:

1. In the making of dough for yeast raised baked products and in which the quantities are expressed as additional quantities by weight based on the total weight of the flour, and in which a predetermined quantity of water is employed in the range from 42 to 69% dependent upon the dough type, the steps which comprise mixing yeast about 2½ to 5½% with salt about 0.187% and not more than half the water required for the dough in the presence of air and at a pressure of the order of 20 to 35 p.s.i. and at a temperature in the range from about 66° to 72° F. and until $pH_{6.5}$ to $pH_6$ is attained, adding additional components of the dough including the remainder of the water and predetermined quantities of carbon dioxide, mixing the combined materials until a predetermined temperature in the range from 75° F. to 84° F. is attained, removing the dough, and preparing the dough for baking including pan proofing the dough for a period of from one half to one hour.

2. In the making of dough for yeast raised baked products and in which the quantities are expressed as additional quantities by weight based on the total weight of the flour and in which a predetermined quantity of water is employed in the range from 42 to 69% dependent upon the dough type, the steps which comprise mixing yeast about 2½ to 5½% with salt about 0.187% and not more than half the water required for the dough, in the presence of air and at a pressure of the order of 20 to 35 p.s.i. and at a temperature in the range from about 66° F. to 72° F. and until $pH_{6.5}$ to $pH_6$ is attained, adding and mixing about 50% to 70% of the flour required for the dough, and adding the additional components of the dough including the balance of the flour and water and predetermined quantities of carbon dioxide, mixing the combined materials and until a predetermined temperature in the range from about 75° F. to 84° F. is attained, removing the dough, and preparing the dough for baking including pan proofing the dough for a period of from about one half to one hour.

3. In the making of dough for yeast raised baked products and in which the quantities are expressed as additional quantities by weight based on the t otal weight of the flour and in which a predetermined quantity of water is employed in the range from 42 to 69% dependent upon the dough type, the steps which comprise mixing yeast about 2½ to 5½% with about 0.187% salt, and not more than half the water required for the dough in the presence of air and at a pressure of the order of 20 to 35 p.s.i. and at a temperature in the range from about 66° F. to 72° F. and until $pH_{6.5}$ to $pH_6$ is attained, adding about half the flour required for the dough, and adding the additional components of the dough including the water and flour and carbon dioxide, agitating the combined materials together for about fifteen minutes and until the temperature of the combined materials is at a predetermined temperature in the range from 75° F. to 84° F., removing the dough, and preparing the dough for baking including pan proofing the dough for a period of from about one half to one hour.

4. In the making of dough for yeast raised baked products the steps which comprise mixing water about 20,000 parts by weight, salt about 1.875 parts by weight, and yeast about 2,500 to 5,500 parts by weight, in the presence of air and at a pressure of the order of 20 to 35 p.s.i. at a temperature in the range from about 66° F. to 72° F.

5. In the making of dough for yeast raised baked products the steps which comprise mixing water about 20,000 parts by weight, salt about 1.875 parts by weight, and yeast about 2,500 to 5,500 parts by weight, in the presence of air and at a pressure of the order of 20 to 30 p.s.i. and at a temperature in the range from about 66° F. to 72° F. for a time period of the order of 5 to 10 minutes.

6. In the making of dough for yeast raised baked products the steps which comprise mixing water about 20,000 parts by weight, yeast, 2,500 to 5,500 parts by weight, with about 1.875 parts by weight of salt, in the presence of air and at a pressure of the order of 20 to 35 p.s.i. at a temperature in the range from about 66° F. to 72° F.

7. In the making of dough for yeast raised products which comprises mixing dough forming ingredients including flour and yeast in the presence of air under pressure and adding carbon dioxide thereto in an amount of the order of 57 cc. to 115 cc. at 30 p.s.i. per 100 pounds of flour.

8. In the making of dough for yeast raised baked products by a sponge and dough process and in which the quantities are expressed as additional quantities by weight based on the total weight of the flour and in which a predetermined quantity of water is employed dependent upon the dough type, the steps which comprise, mixing yeast 2½ to 6%, salt about 0.1875% and water about 21 to 48% in the presence of air and at a pressure of the order of 20 to 35 p.s.i. and at a temperature in the range of from about 66° F. to 72° F. and until $pH_{6.5}$ to $pH_6$ is attained; adding about 50 to 70% flour, and mixing the same, adding water to bring the total water added to about 34 to 56% and adding carbon dioxide 57 to 115 cc. per 100 pounds of flour at 30 p.s.i. with about 8% water, adding 50 to 30% flour, and salt about 1 to 2½%, sugar 0 to 17%, shortening about 4 to 20%, and milk powder 0 to 7%, and mixing the combined materials for about ten to fifteen minutes and until the temperature of the mix is about 84° F. to 72° F., removing the dough, and pan proofing the dough.

9. The making of dough as defined in claim 8 for regular white dough in which the yeast is in the range from 2½ to 5½%, the water added to the yeast is about 32%; dough improver is added after the flour, the second salt addition is about 2%, the sugar is about 2 to 5½%, the shortening is about 4 to 6%, the milk powder is 6 to 7%, and the temperature to be attained in the combined materials is about 82° F. to 72° F.

10. The making of dough as defined in claim 8 for rye dough in which the yeast is in the range from 5 to 6%, the water added to the yeast is about 31%, the flour first added consists of about 30% clear flour and about 20% rye flour, dough improver is added, the remaining water added brings the total water added to about 54%, the flour added as the second flour addition consists of about 30% clear flour and about 20% rye flour, the salt added is about 2%, and the combined materials are mixed for about six minutes and until the temperature is about 79° F.

11. The making of dough as defined in claim 8 for sweet dough, in which the yeast is 10 to 11%, the water added to the yeast is about 21 to 25%, the flour first added consists of about 50 to 40% spring flour and 0 to 10% cake flour, the additional water added is 13 to 17%, the second flour addition consists of 40 to 10% spring flour and 0 to 10% cake flour, the second salt addition is about 1%, sugar added is about 17%, shortening added is about 20%, milk powder added is about 5%, whole eggs about 15% are added, and the combined materials are mixed for about ten minutes and until the temperature is about 80 to 84° F.

12. The making of dough as defined in claim 8 for hearth dough in which the yeast is about 3½ to 4½%, the water added to the yeast is about 37%, the flour first added is about 65%, dough improver is added, the water then added is 15 to 12%, the milk powder added is about 3%, additional salt about 3% is added, the sugar added is about 3%, the shortening added is about 4%, egg whites 2½ to 3% are added, and the combined materials are mixed for about six minutes and until the temperature of the mix is about 75 to 76° F.

13. The making of dough as defined in claim 8 for wheat dough in which the yeast is about 5 to 6%, the water added to the yeast is about 48%, the flour first added is about 60% whole wheat flour and 10% white clear flour, the water then added is about 13%, the second salt addition is about 2½%, the sugar added is about 6%, malt about 0.375% is added, dough improver is added, the second flour addition is about 30% white clear flour, the shortening added is about 4%, and the combined materials are mixed for about eight to ten minutes and until the temperature of the mix is about 79° F.

14. In the making of dough for yeast raised baked products by the straight dough process and in which the quantities are expressed as additional quantities by weight based on the total weight of the flour and in which a predetermined quantity of water is employed dependent upon the dough type, the steps which comprise mixing yeast 2½ to 6%, salt about 0.1875%, and water 22 to 20% in the presence of air and at a pressure of the order of 20 to 35 p.s.i. and at a temperature in the range from about 66° F. to 72° F. and until $pH_{6.5}$ to $pH_6$ is attained; separately mixing water about 34 to 36% and carbon dioxide 57 to 115 cc. per 100 pounds of flour at 30 p.s.i. with about 8% water; adding salt about 1.1 to 2%, sugar 0 to 17%, malt 0 to 3%; adding 100% flour, adding the yeast mixture and shortening 0 to 20%, and mixing the combined materials for about six to fifteen minutes and until a predetermined temperature of the mix in the range from about 75° F. to 84° F. is attained, removing the dough; and pan proofing the dough.

15. The making of dough as defined in claim 14 for regular dough in which the yeast is 2½ to 5½%, the water added with the yeast is about 22 to 20%, the water separately mixed is about 34 to 36%, the salt then added is about 2%, the sugar added is about 5 to 3%, the malt added is about ½%, dough improver is added, milk powder about 6% is added after the flour, the shortening added after the yeast mixture has been added and agitated is about 6%, the mixing agitation is continued, and the mixing of the combined materials is continued for about ten to fifteen minutes and until the temperature of the mix is about 80 to 82° F.

16. The making of dough as defined in claim 14 for rye dough in which the yeast is 5 to 6%, the water added with the yeast is about 20%, the salt subsequently added is about 2%, the water then added is about 34%, dough improver is added, the flour first added is clear flour about 60 to 70% and rye flour 40 to 30% to total 100% with agitation, and after the yeast mixture has been added the mixing of the combined materials is continued for about six to eight minutes and until the temperature of the mix is about 77 to 79° F.

17. The making of dough as defined in claim 14 for sweet dough in which the yeast is 10 to 11%, the water added with the yeast is about 21%; the sugar about 17%, shortening about 20%, salt about 1.1 to 1.4%, eggs about 15%, malt 2 to 3%, carbon dioxide and water, water 21 to 13%, flour 100%, and milk powder about 5% are separately mixed; the yeast mixture and other mixture are combined and the mixing of the combined materials is continued for about ten minutes and until the temperature of the mix is about 80 to 84° F.

18. The making of dough as defined in claim 14 for hearth dough in which the yeast is 3½ to 4½%, the water added with the yeast is about 20%, the salt about 1¾%, sugar about 3%, malt about 3%, dough improver, carbon dioxide and water, and about 32 to 29% water are separately mixed; the yeast mixture and other mixture are combined; about 100% high gluten flour and milk powder 3% are added and mixed; the yeast mixture and other mixture are combined and shortening about 4% and egg whites about 2½ to 3% are added; and the mixing of the combined materials is continued for about six to eight minutes and until the temperature of the mix is about 75 to 76° F.

19. The making of dough as defined in claim 14 for wheat dough in which the yeast is about 5 to 6%, the water added to the yeast is about 20%; the salt about 2%, sugar about 6%, dough improver, malt about 0.375%, carbon dioxide and water, and water about 41%, are mixed and whole wheat flour about 60% and clear flour about 40% are added and separately mixed; the separately mixed materials and the yeast mixture are combined and shortening about 4% is added; and the mixing of the combined materials is continued for about fifteen minutes and until the temperature of the mix is about 79° F.

References Cited in the file of this patent
UNITED STATES PATENTS

| | | |
|---|---|---|
| 1,271,271 | Roush | July 2, 1918 |
| 2,326,134 | Freilich | Aug. 10, 1943 |
| 2,740,362 | Elliot | Apr. 3, 1956 |

OTHER REFERENCES

The Fleischmann No-Dough-Time Process of Bread Making, received in Patent Office prior to Aug. 1, 1939, 6 pp., page 6 relied on.

Baking Science and Technology, vol. II, 1952, by Pyler, published by The Siebel Publishing Co. (Chicago), pp. 393, 394, 404, 446.

Bakers Weekly, Aug. 2, 1954, pp. 25 to 28.